United States Patent [19]

Yamamoto et al.

[11] 4,420,396

[45] Dec. 13, 1983

[54] FILTER DEVICE FOR FUEL TANK

[75] Inventors: Kiyokazu Yamamoto, Fujisawa; Ko Hiratsuka, Chigasaki; Toshie Tanaka, Machida; Shigeyuki Iwasaki, Machida, all of Japan

[73] Assignees: Nifco Inc.; Jidosha Denki Kogyo Kabushiki Kaisha, both of Yokohama, Japan

[21] Appl. No.: 374,782

[22] Filed: May 4, 1982

[30] Foreign Application Priority Data

May 8, 1981 [JP] Japan .................. 56-68205

[51] Int. Cl.³ .............. B01D 27/04; B01D 35/02
[52] U.S. Cl. ................ 210/416.4; 210/172; 210/232; 210/436; 210/454; 210/460; 210/472
[58] Field of Search ............. 210/172, 232, 416.4, 210/416.5, 436, 453, 454, 460, 462, 472, 484, 485, 493.2, 541

[56] References Cited

U.S. PATENT DOCUMENTS

| | | | |
|---|---|---|---|
| 2,788,125 | 4/1957 | Webb | 210/460 X |
| 3,061,105 | 10/1962 | Bradbury et al. | 210/454 X |
| 3,163,229 | 12/1964 | Salisburg | 210/460 X |
| 3,335,917 | 8/1967 | Knight | 210/453 X |
| 3,382,984 | 5/1968 | Kuss | 210/454 X |
| 3,707,236 | 12/1972 | Takebayasi | 210/460 X |
| 3,826,372 | 7/1974 | Bell | 210/460 X |
| 3,833,124 | 9/1974 | Sugiyama et al. | 210/460 |
| 3,900,397 | 8/1975 | Bell | 210/460 X |
| 4,204,960 | 5/1980 | Sugiyama et al. | 210/462 X |
| 4,304,664 | 12/1981 | McAlindon et al. | 210/460 X |

FOREIGN PATENT DOCUMENTS 52-37915 8/1977 Japan.
53-42840 10/1978 Japan.
56-10917 3/1981 Japan.

Primary Examiner—Robert H. Spitzer
Attorney, Agent, or Firm—Trexler, Bushnell & Wolters, Ltd.

[57] ABSTRACT

A filter device for a fuel tank comprises an upper wall for supporting in position a tubular member such as a fuel line or a pump casing, a bottom wall disposed at a distance from the upper wall, and a cylindrical wall supporting in position a mesh encircling the space intervening between the upper wall and the bottom wall. The cylindrical wall and either the upper wall or the bottom wall are integrally molded of a plastic material in one integral part, the bottom wall or the upper wall is molded separately of a plastic material in a separate part to be fitted to the free end of the cylindrical wall in the one integral part, one of the two parts which has an outer fitting peripheral wall surface is formed of a plastic material having a smaller rate of dimensional change, and the other part which has an inner fitting peripheral wall surface is formed of a plastic material having a larger rate of dimensional change.

28 Claims, 13 Drawing Figures

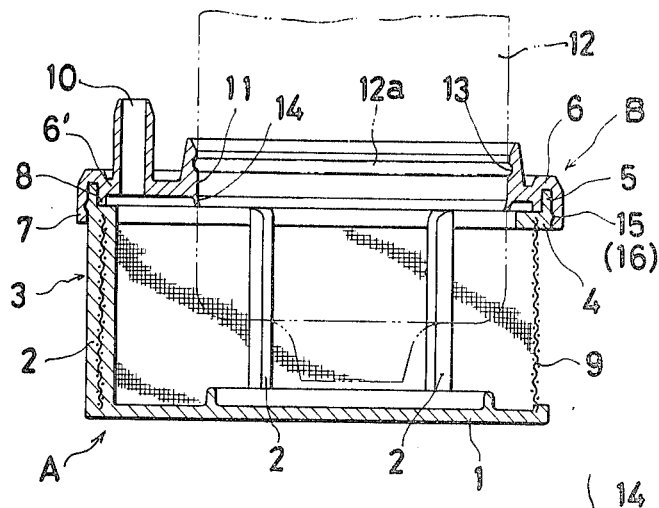
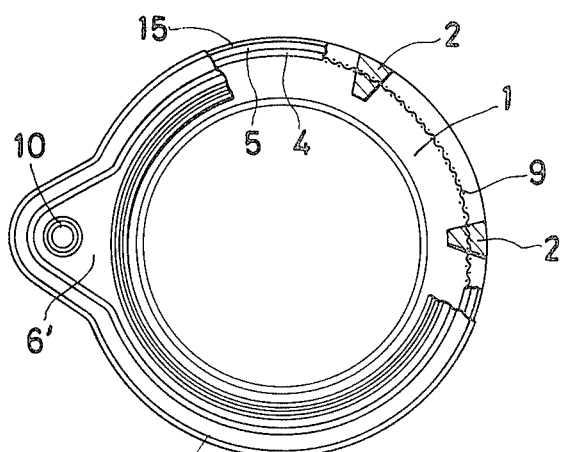
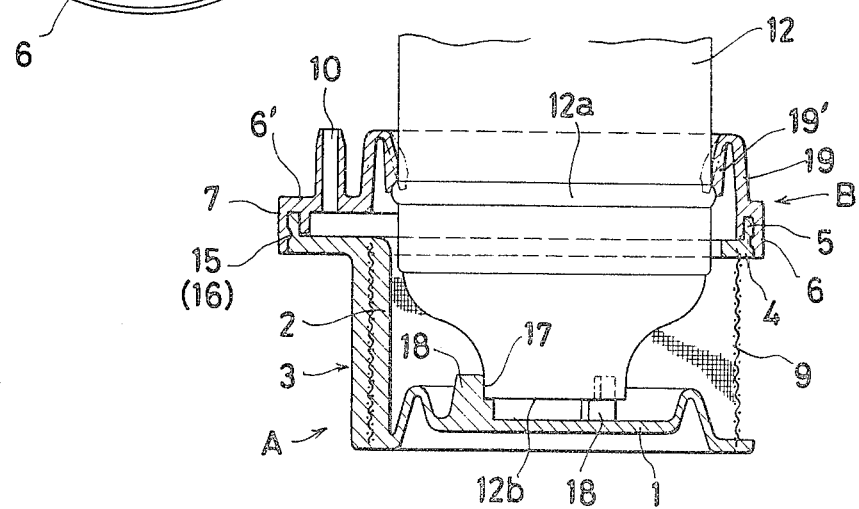

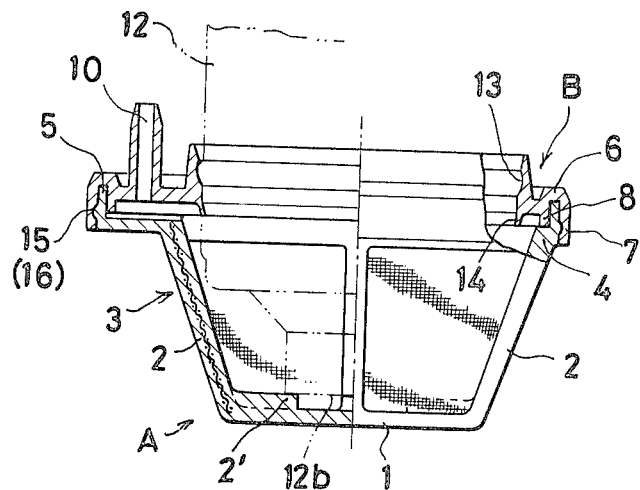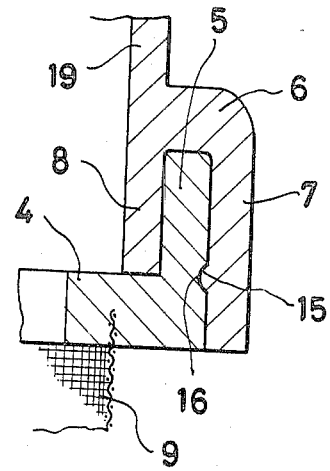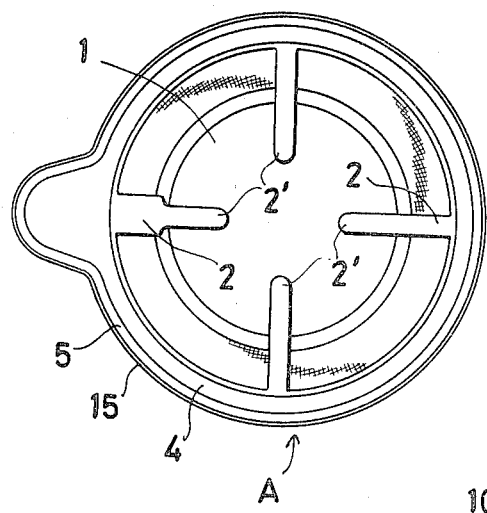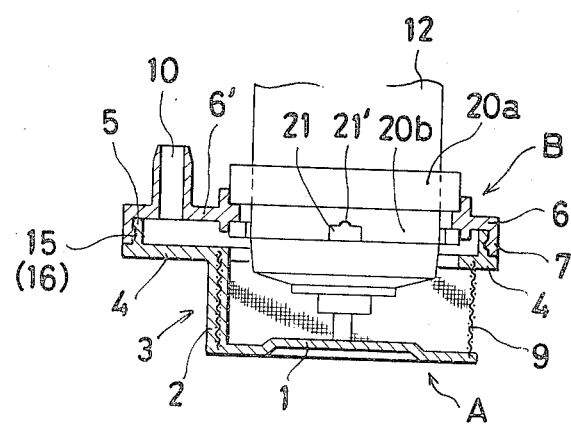

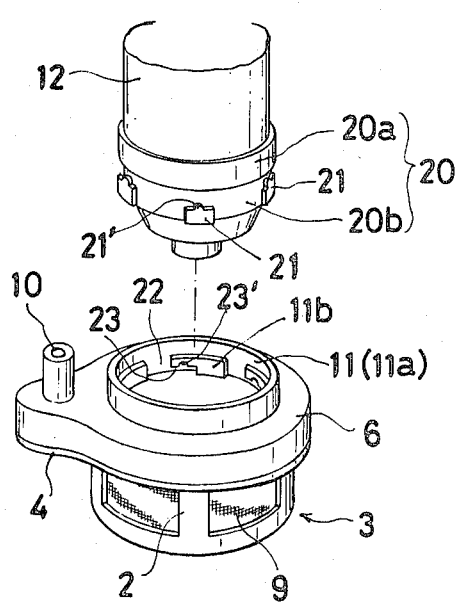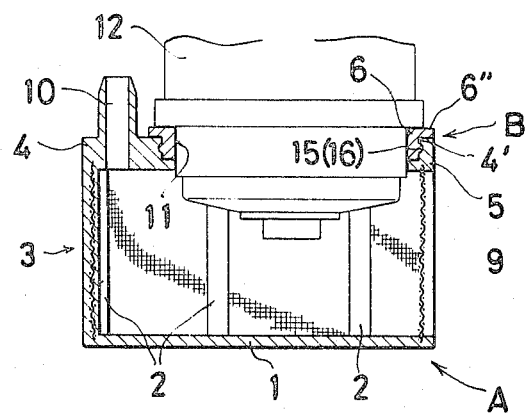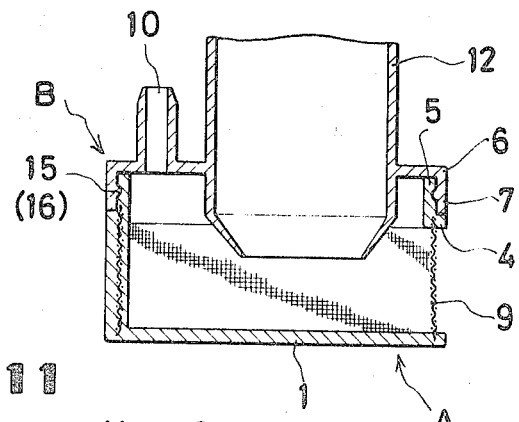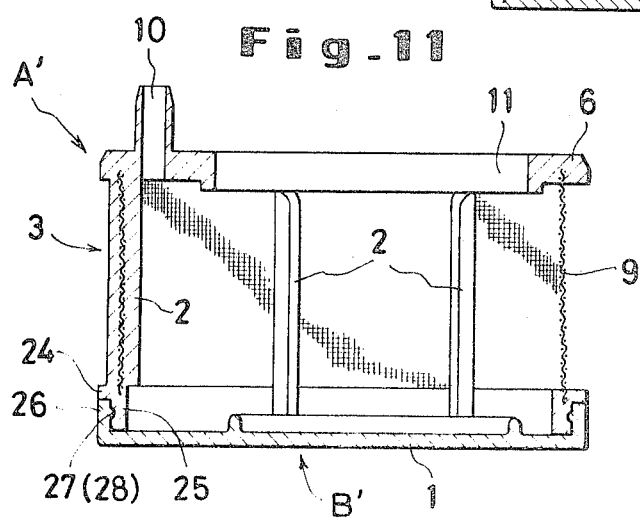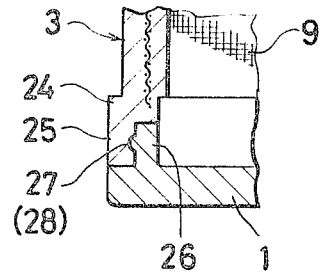

FILTER DEVICE FOR FUEL TANK

BACKGROUND OF THE INVENTION

This invention relates to a strainer or filter device (hereinafter referred to as "filter device") to be set in position in a fuel tank such as of an automobile and used for filtering a fuel being forwarded by a fuel pump to a carburetor.

Generally a filter device for disposition in a fuel line connected to a fuel pump or on a fuel pump within a fuel tank comprises an upper wall passing through and supporting in position the casing of the pump, a bottom wall spaced from the upper wall, and a cylindrical wall formed of a group of circumferentially spaced columns serving to support in position a mesh enclosing the space intervening between the upper wall and the bottom wall. Filter devices in which such walls are made of a plastic material have been disclosed by Japanese Utility Model Publication Nos. 37915/1977, 42840/1978, and 10917/1981. Ideally, the upper wall, bottom wall, and cylindrical wall would all be molded integrally in one piece of a plastic material. Since this is not realistic, Japanese Utility Model Publication Nos. 37915/1977 and 42840/1979 propose to form a cylindrical wall and a bottom wall integrally in one piece, cause engaging claws formed in the leading ends of the columns of the cylindrical wall to pass through engaging holes formed along the peripheral edge of an upper wall formed separately, and consequently secure the upper wall to the upper end of the cylindrical wall through the medium of these engaging claws. In addition to being complicated in construction, there is a possibility with this filter device that play may develop between the engaging claws and the upper wall fastened thereby because of imprecision in fabrication. When play is present, fuel which has escaped being passed through the mesh is forwarded by the pump and causes the carburetor to be clogged with foreign particles. Japanese Utility Model Publication No. 10917/1981 discloses nothing about the fixing of the upper wall or the bottom wall to the cylindrical wall. In any event, no other method has been available for constructing the filter device than by resorting to a complicated procedure such as is taught by Japanese Utility Model Publication No. 37915/1977.

Different plastic materials have different thermal expansion coefficients. In automobile fuels such as gasoline, methanol, ethanol and other alcohols, or mixtures of gasoline with such alcohols, molded plastic articles absorb these fuels and swell. The rate of this swelling likewise differs from one plastic to another. Owing to these variations, when different plastics are molded in the shape of doughnuts, for example, the articles molded of plastics having high coefficients of thermal expansion or high rates of swelling change greatly in outside and inside diameter and those having low coefficients of thermal expansion or low rates of swelling change only slightly in outside and inside diameter upon exposure to heat or fuels. The concept of coefficient of thermal expansion is well known and does not require further expansion. Therefore, only the rates of swelling will be discussed. The rate of swelling is as high as about 4% in the case of polyamide resins such as nylon and as low as about 1% in the case of polyacetal resins.

SUMMARY OF THE INVENTION

One object of this invention is to provide a filter device which, by making effective use of differences in rates of dimensional change due to thermal expansion or the swelling with fuel or the like, as described above, enables an upper wall or a bottom wall to be fixed securely to a cylindrical wall in a simple structure without entailing development of play at the joints.

To accomplish the object described above according to the present invention, there is provided a filter device for a fuel tank which comprises an upper wall for supporting in position a tubular member such as a fuel line or a pump casing, a bottom wall disposed at a distance from the upper wall, and a cylindrical wall supporting in position a mesh enclosing the space intervening between the upper wall and the bottom wall, which assumes its completely assembled form by a procedure of molding the cylindrical wall and either the upper wall or the bottom wall in one integral part of a plastic material, separately molding whichever of the bottom wall and the upper wall that is not molded integrally with the cylindrical wall in a separate part of a plastic material, and fitting the separately molded part to the free end of the cylindrical wall of the aforementioned integrally molded part, and which, for the purpose of ensuring perfection of assemblage, has the part containing a peripheral wall surface intended to be placed outside formed of a plastic material having a lower rate of dimensional change and the part containing a peripheral wall surface intended to be placed inside formed of a plastic material having a higher rate of dimensional change.

When the filter device produced by forming different parts with plastic materials having different rates of dimensional change and assembling the parts as described above is immersed in a fuel, the part containing the peripheral wall surface which is placed inside swells more than the part containing the peripheral wall surface which is placed outside. Consequently, the two parts are bound fast with each other.

The other objects and characteristics of the present invention will become apparent from the further disclosure of the invention to be given herein with reference to the accompanying drawing.

BRIEF DESCRIPTION OF THE DRAWING

FIG. 1 is a longitudinal cross section of a first embodiment of the filter device according to the present invention.

FIG. 2 is a partially cutaway plan view of the filter device of FIG. 1.

FIG. 3 is an enlarged cross section of an essential part of the filter device of FIG. 1.

FIG. 4 is a longitudinal cross section of a second embodiment of the filter device according to the present invention.

FIG. 5 is an enlarged cross section of an essential part of the filter device of FIG. 4.

FIG. 6 is a partially sectioned side view of a third embodiment of the filter device according to the present invention.

FIG. 7 is a plan view of a cylindrical wall joined with a bottom wall in the filter device of FIG. 6.

FIG. 8 is a longitudinal cross section of a fourth embodiment of the filter device according to the present invention.

FIG. 9 is a perspective view illustrating a condition in which a pump is attached to the filter device of FIG. 8.

FIG. 10 is a longitudinal cross section of a fifth embodiment of the filter device according to the present invention.

FIG. 11 is a longitudinal cross section of a sixth embodiment of the filter device according to the present invention.

FIG. 12 is an enlarged cross section of an essential part of a seventh embodiment of the filter device according to the present invention.

FIG. 13 is a longitudinal cross section of an eighth embodiment of the filter device according to the present invention.

DESCRIPTION OF PREFERRED EMBODIMENT

FIGS. 1–3 illustrate a first embodiment of a filter device produced by forming a bottom wall and a cylindrical wall in one integral part and attaching fast to the upper end of the cylindrical wall portion of the integral part in upper wall separately formed (hereinafter referred to as "upper lid type filter device"). A bottom wall 1 and a cylindrical wall 3 consisting of column members 2 are formed in one integral part A. The cylindrical wall 3 contains a frame member 4 at the upper end thereof. From the upper surface of the frame member 4, a thin fixing peripheral wall 5 projects upwardly along the periphery of the frame member. An upper wall 6 is formed separately of the aforementioned one integral part as a separate wall B. The upper wall 6 has along the peripheral edge thereof an outer peripheral wall 7 adapted to fit around the fixing peripheral wall 5 and the outer periphery of the frame member 4. Inside the outer peripheral wall 7, it also has an inner peripheral wall 8 having a small downward extension and adapted to fit on the inner periphery of the fixing peripheral wall 5. Between the walls 7, 8 is formed a fitting groove. By 9 is denoted a mesh in the shape of a cylinder. The mesh has the upper end thereof embedded in the frame member 4 at the upper end of the cylindrical wall, the lower end thereof embedded in the bottom wall 1, and the peripheral side thereof embedded at regular intervals in the column members 2. This mesh is set in position in an insert mold at the time the relevant components are formed as an integral part. The upper wall, the bottom wall, and the cylindrical wall, in their plan view, are roughly circular except for the portions which are projected outwardly. The upper wall 6 is provided on the projected portion 6' thereof with a vertically perforated connection port 10 raised upwardly. One end of a tube is connected to this connection port 10 and the other end of the tube is extended into the air space within the fuel tank to permit escape of air from within the filter device.

The upper wall 6 is provided at the center thereof with an opening 11 adapted to deliver to the carburetor the gasoline, alcohol, or mixture thereof (fuel) which has been filtered through the mesh 9. Where the fuel pump is provided outside the fuel tank, a fuel line which is connected to the intake port of the pump to complete a tube path extended into the tank interior is passed through the aforementioned opening 11 and held in position. In the present embodiment, however, this opening 11 has a large diameter in order to admit and support in position the lower part of a cylindrical casing 12 of a pump having an intake port at the lower end thereof and permit the pump to be set within the fuel tank. No matter whether it is a fuel line or the casing of the pump that is supported in position in the opening 11, this opening has an annular groove 13 formed in the inner wall thereof. A node 12a formed on the outer periphery of the fuel line or the pump casing 12 as by a bulging operation is pushed and snapped into engagement with this annular groove 13 to position the fuel line or the pump in the axial direction. An annular lip 14 is projected from the inner edge of the opening. This annular lip 14 serves to squeeze the outer periphery of the fuel line or the casing desirably to seal the upper wall 6.

Attachment of the upper wall 6 to the rest of the filter device can be accomplished by plunging the fitting peripheral wall 5 projected upwardly from the upper surface of the frame member 4 of the cylindrical wall into the fitting groove of the upper wall. In the present embodiment, the outer periphery of the fixing peripheral wall 5 constitutes itself an inner peripheral wall surface. On the outer periphery of the fixing peripheral wall 5, a slightly bulged continuous protuberance 15 is formed throughout the entire circumference thereof. The inner periphery of the outer peripheral wall 7 of the upper wall constitutes itself an outer peripheral wall surface. In the outer peripheral wall 7, a continuous recess 16 adapted to receive into fast engagement the continuous protuberance 15 when the fixing peripheral wall 5 is plunged into the fitting groove is similarly formed throughout the entire circumference thereof. The one integral part A, therefore, is molded of a synthetic resin, such as polyamide resin including nylon 6, polyethylene resin, etc., which has a large rate of dimensional change, whereas the upper wall 6 which is a separately formed wall is molded of a synthetic resin such as polyacetal resin which has a small rate of dimensional change.

When the filter device is set in position within the fuel tank in a state wherein the fixing peripheral wall 5 of the one integral molded part A is fitted in the inner periphery of the outer peripheral wall of the upper wall and the continuous recess 16 and the continuous protuberance 15 formed on the two peripheral wall surfaces, the upper wall (separately molded part B) is swelled in conjunction with the one integral part A by the gasoline or alcohol held in the tank. Since the rate of dimensional change is greater in the one integral part A, the fixing peripheral wall 5 swells between the outer peripheral wall 7 which is not swelled appreciably and the inner peripheral wall 8 and, consequently, causes the continuous protuberance 15 formed on the outer periphery thereof to force its way into the continuous recess 16 in the inner periphery of the outer peripheral wall. While the filter device is in service, therefore, no play develops at any joint. There is no possibility of the joined parts coming loose. Unlike the conventional device described above, the filter device of this invention has no need for an engaging claw and an engaging hole as are conventionally to be formed in complicated shapes. None of the parts of the filter device of this invention is required to be manufactured with high enough precision to preclude generation of play at the joints to be formed in the assemblage of the parts. Instead, these parts need only be manufactured so that they may be fitted together by application of slight force. The filter device, therefore, is easy to manufacture.

The second embodiment illustrated in FIGS. 4, 5 is also an upper lid type filter device. The major differences of the second embodiment from the first embodiment are the manner in which the casing of the pump proper is supported in position and the fact that the continuous protuberance 15 is formed on the inner periphery of the outer peripheral wall 7, namely the outer peripheral wall surface and the continuous recess 16 is formed on the outer periphery of the fixing peripheral wall 5, namely the inner peripheral wall surface throughout the entire circumference.

The bottom plate 1 has a cross section of the shape of a diaphragm. It is provided at the center thereof with a plurality of ribs 18 radially disposed and each incorporating on the inner side thereof a step 17 for receiving and retaining a downwardly converged intake port 12b formed at the lower end of the casing 12. The ribs 18 serve to keep the intake port at a distance from the bottom surface. The opening at the center of the upper wall 6 has a diameter greater than the outside diameter of the casing. It is formed by the inner periphery of a flexible overfolded portion 19′ of the fixing peripheral wall 19 which is raised to some extent from the upper wall 6 and subsequently folded over inwardly. The inside diameter of the overfolded portion 19′ is slightly smaller than the outside diameter of the casing. Attachment of the casing is accomplished by pushing the casing into the interior of the overfolded part 19′. Consequently, the overfolded part 19′ is expanded to permit passage therethrough of the casing and the node 12a. As the intake port 12b collides with the step 17, the node 12a just slides past the lower end of the overfolded part 19′ and is received and retained fast by the lower end of the overfolded part 19′ so as not to slip off upwardly. When the casing is fixed in this manner, the intake port is prevented from being lowered to the bottom wall and shut off.

Also in this embodiment, the one integral part A which consists of the bottom wall and the cylindrical wall is molded of a synthetic resin such as polyamide resin which has a large rate of dimensional change and the separately formed upper wall 6 (the part B) is molded of a synthetic resin such as polyacetal resin which has a small rate of dimensional change. When these parts are assembled and the produced filter device is set in position within the fuel tank, the continuous protuberance 15 and the continuous recess 16 are brought into tight mutual engagement owing to the difference of the rate of dimensional change similarly to those in the preceding embodiment.

The third embodiment illustrated in FIGS. 6, 7 is an upper lid type filter device substantially similar to the filter device of the first embodiment of FIGS. 1–3, except that the cylindrical wall 3 has the shape of a truncated cone and that the column members 2 of the cylindrical wall are extended toward the center of the cylindrical wall over the bottom wall 1 and the extended portions 2′ serve to keep the intake port 12b at the lower end of the pump casing at a distance from the bottom wall in much the same way as in the embodiment of FIGS. 4, 5. From the frame member 4 at the upper end of the cylindrical wall, a fixing peripheral wall 5 is raised along the outer periphery of the frame member. This fixing peripheral wall 5 is so adapted as to fit into the fitting groove formed between the outer peripheral wall 7 and the inner peripheral wall 8 of the upper wall 6. A continuous protuberance 15 is formed on the outer periphery of the fixing peripheral wall 5, namely the inner peripheral wall surface and a continuous recess 16 is formed in the inner periphery of the outer peripheral wall 7, namely the outer peripheral wall surface throughout the entire circumference, so as to be brought into fast mutual engagement. Also in this embodiment, the one integral part A is molded of a synthetic resin such as nylon which has a large rate of dimensional change and the separately formed upper wall (the part B) molded of a plastic resin having a small rate of dimensional change. When the parts are assembled and the completed filter device is immersed in the fuel, therefore, the upper wall is joined powerfully to the cylindrical wall of the one integral part.

The fourth embodiment illustrated in FIGS. 8, 9 is similarly an upper lid type filter device. From the frame member 4 of the cylindrical wall 3 molded integrally with the bottom plate, the fixing peripheral wall 5 is raised. A continuous recess 16 is formed in the outer periphery of the fixing peripheral wall 5 throughout the entire circumference. The upper wall 6 only possesses the outer peripheral wall 7 and lacks the inner peripheral wall which would define a fitting groove in conjunction with the outer peripheral wall. On the inner periphery of the outer peripheral wall namely the outer peripheral wall surface, a continuous protuberance 15 adapted to come into fast engagement with the aforementioned continuous recess 16 is formed throughout the entire circumference. Even when the fitting groove is absent and the fixing peripheral wall is fitted to the inner periphery of the outer peripheral wall and the continuous protuberance 15 is brought into fast engagement with the continuous recess 16 as in the present embodiment, the upper wall and the cylindrical wall of the one integral part A are strongly joined while the filter device is in service insofar as the one integral part A is molded of nylon having a large rate of dimensional change and the upper wall (the separate part B) is molded of a polyacetal resin having a small rate of dimensional change. In the present embodiment, the manner in which the pump casing is set in position is notably different from any of the manners described above.

On the outer periphery of the casing 12, a ring 20 made of polyacetal resin similarly to the upper wall 6 is fitted fast. The outside diameter of this ring is greater in the upper half portion 20a and slightly smaller in the lower half portion 20b. From the outer periphery of the lower half portion 20b, a plurality of push-button shaped projected pieces 21 are raised at regular intervals. The inside diameter of the opening 11 of the upper wall is larger in the upper half portion 11a and slightly smaller in the lower half portion 11b. The larger inside diameter equals the outside diameter of the upper half portion 20a of the ring 20 and the slightly smaller inside diameter equals the outside diameter of the lower half portion 20b of the ring 20 respectively. The lower half portion 11b is provided with vertical grooves 22 disposed coincidently with the projected pieces 21 in the lower half portion of the ring so as to permit passage of the projected pieces in the axial direction and horizontal grooves 23 disposed so as to continue into the vertical grooves 22 each in the shape of the letter L. In the upper edges of the horizontal grooves 23, recesses 23′ matched to the protuberances 21′ formed on the upper side of the projected pieces 21 are formed. The vertical grooves 22 and the horizontal grooves 23 may be opened into the lower end of the opening 11 as illustrated in FIG. 9.

Fixing of the pump is commenced by aligning the projected pieces 21 of the ring and the vertical grooves 22 with each other, pushing the pump casing 12 axially into the opening 11, and bringing the step between the upper half portion and the lower half portion of the ring into contact with the upper end of the opening 11. In the resultant state, the pump is given an angular rotation in one direction relative to the upper wall, so that the projected pieces 21 may enter the horizontal grooves 23. As the rotation is continued with slightly increased force, the projected pieces 21 collide with the recesses of the horizontal grooves 23, the protuberances 21' come into fast engagement with the recesses 23', and the pump is fixed against the upper wall 6. The slightly increased force is required for the purpose of forcing the protuberances 21' into fast engagement with the recesses 23'. Once this fast engagement is established, the pump is no longer allowed to rotate in either direction. Further, the pump is not allowed to move upwardly in the axial direction because the stepped portion of the ring 20 is kept in contact with the upper side of the opening 11 and it is not allowed to move downwardly in the axial direction because the projected pieces 21 are pressed against the upper sides of the horizontal grooves 23.

The present embodiment has been described as accomplishing the fixing of the pump by the steps of fitting the ring 20 on the pump casing, pushing the ring 20 axially into the opening 11 of the upper wall, and subsequently giving an angular rotation to the ring relative to the upper wall thereby fastening the ring to the upper wall. Alternatively, the fixation of the pump may be accomplished by raising a male screw thread on the outer periphery of the ring, cutting a female screw thread in the inner periphery of the opening, and fastening the pump casing to the upper wall by helically driving the ring into the opening until the intake port 12b at the lower end of the casing comes into contact with the partially projected members 18 or the extended portions 2, for example.

The fifth embodiment illustrated in FIG. 10 is also an upper lid type filter device. Unlike any of the embodiments so far described, this filter device is so constructed that the upper wall 6 may be fastened to the inner periphery of a hole formed in the frame member 4 at the upper end of the cylindrical wall 3. The frame member 4 possesses a hole 4' which conforms with the outer boundary of the fixing peripheral wall 5 of the upper wall 6. The continuous protuberance 15 is formed on either of the outer periphery of the fixing peripheral wall 5 and the inner periphery of the hole 4' and the continuous recess 16 is formed in the other of the two peripheries. In the present embodiment, since the connection port 10 is formed as an air vent is in the frame member, the upper wall is in the shape of a ring adapted to fit to the pump casing or the fuel line. Optionally, it may be formed in the shape of an egg or water drop and the connection port may be provided in the upper wall. From the upper end of the outer periphery of the upper wall is projected a flange 6''. The continuous protuberance 15 and the continuous recess 16 are brought into engagement when the fixing peripheral wall of the upper wall is pushed into the hole 4' until the flange 6'' comes into contact with the upper end of the frame member. In the present embodiment, since the inner peripheral wall surface is formed by the outer periphery of the fixing peripheral wall of the upper wall and the outer peripheral wall surface is formed by the inner periphery of the hole 4' in the frame member, the upper wall 6 is formed of a plastic material having a larger rate of dimensional change and the cylindrical wall integral with the bottom wall is formed of a plastic material having a smaller rate of dimensional change, contrary to any of the embodiments described above.

When the filter device is immersed in the fuel, therefore, the upper wall swells more than the cylindrical wall. Consequently, the continuous protuberance and the continuous recess are pressed powerfully against each other and the upper wall is bound powerfully with the cylindrical wall.

In this case, the union between the casing and the upper wall tends to loosen. Since the upper wall is enclosed along the entire boundary thereof with the cylindrical wall, the swelling of the upper wall is limited. The repulsive force of the engagement between the continuous protuberance and the continuous recess goes to strengthen the union between the casing and the upper wall.

FIG. 11 illustrates, as a sixth embodiment of this invention, a filter device produced by forming an upper wall and a cylindrical wall in one integral part and attaching to the lower end of the cylindrical wall a bottom wall formed separately (hereinafter referred to as "bottom plate type filter device"). The upper wall 6 and the cylindrical wall 3 are simultaneously formed as one integral part A' and the bottom wall 1 is separately formed as a separate wall B'.

The cylindrical wall 3 has a fixing peripheral wall 25 projected downwardly from a frame member 24 at the lower end. From the outer periphery of the bottom wall 1 is raised a peripheral wall 26 adapted to fit the inner periphery of the aforementioned fixing peripheral wall. A continuous protuberance 27 is formed on either of the outer periphery of the fixing peripheral wall 25 and the peripheral wall 26 and a continuous recess 28 is formed in the other of the two walls just mentioned. The continuous protuberance and the continuous recess come into fast engagement when the fixing peripheral wall 25 and the peripheral wall 26 are completely fitted to each other.

In the present embodiment, the binding force produced between the cylindrical wall and the bottom wall in the filter device as set in position for actual service is enhanced by forming the cylindrical wall molded integrally with the upper wall and provided with the fixing peripheral wall fitting the inner periphery of the peripheral wall of the bottom wall with a plastic material having a larger rate of dimensional change and forming the bottom wall with a plastic material having a smaller rate of dimensional change. The same effect is brought about by reversing the use of the plastic materials and adapting the bottom wall so that it will fit to the inner periphery of the cylindrical wall 3 as shown in FIG. 12.

When the bottom wall having a larger rate of dimensional change is attached to the bottom portion of the cylindrical wall, there naturally ensues generation of an action which tends to expand radially the lower portion of the cylindrical wall. Since the cylindrical wall is molded integrally with the upper wall, however, it is capable of impeding this action and consequently producing strong union with the bottom wall.

Even in the bottom plate type filter device, similarly to any of the embodiments of FIGS. 1–3, FIGS. 4–5 and FIGS. 6–7, the bottom wall may be provided on the inside of the peripheral wall 26 with an inner peripheral wall so that the fixing peripheral wall 25 may be thrust into fast engagement with the fitting groove to be consequently formed between the two peripheral walls.

The embodiment of FIG. 13 represents a filter device which has an upper wall 6 molded integrally with a tubular member 12 such as a fuel line or a pump casing. In the present embodiment, the upper wall 6 is molded integrally with a connection port 10 in addition to the tubular member 12. The upper wall 6 possesses an outer peripheral wall 7. On the outer peripheral wall surface, namely the inner periphery of the outer peripheral wall 7, a continuous protuberance 15 is formed. From the frame member 4 of the cylindrical wall which is one portion of the one integral part A containing the bottom wall 1, a fixing peripheral wall 5 is raised. In the inner peripheral wall surface or the outer periphery of the fixing peripheral wall 5, there is formed a continuous recess 16 which comes into engagement with the aforementioned continuous protuberance 15 when the respective peripheral walls are fitted to each other. The one integral part and the upper wall, therefore, can be bound powerfully with each other by forming the one integral part with a plastic material having a larger rate of dimensional change and the upper wall with a plastic material having a smaller rate of dimensional change. Optionally, the upper wall molded integrally with the tubular member 12 may be formed integrally with the cylindrical wall and the bottom wall formed as a separate wall may be joined to the lower portion of the cylindrical wall similarly to the embodiment of FIG. 11. Also in this case, depending on whether the bottom wall is fitted to the outer periphery of the cylindrical wall or to the inner periphery thereof, either of the one integral part and the bottom wall which is the separate wall is formed with a plastic material having a larger rate of dimensional change and the other with a plastic material having a smaller rate of dimensional change to ensure production of powerful union.

The rates of dimensional change involved in the embodiments described above are based on the rates of volumetric expansion of the relevant walls observed when the filter devices are immersed in a fuel such as gasoline. Now, dimensions of the continuous protuberance and the continuous recess which are adapted to come into fast engagement with each other will be cited by way of illustration. The amount of projection of the continuous protuberance from either of the inner and outer peripheral walls such as of the other peripheral surface of the fixing peripheral wall is about 0.15 mm where the ratio of curvature of the protuberance is about 1 mm. In contrast, the amount of recession of the continuous recess from the other peripheral wall is about 0.2 mm where the ratio of curvature of the recess is similarly about 1 mm. As described above, the present invention can provide powerful union of the two walls by making use of the different rates of dimensional change due to thermal expansion. In this case, the one integral wall and the separate wall may be formed with a plastic material having a larger rate of thermal expansion or a larger rate of dimensional change and a plastic material having a smaller rate of thermal expansion or a smaller rate of dimensional change respectively. Generally, plastic materials having large rate of swelling tend to have large rates of thermal expansion and plastic materials having small rates of swelling tend to have small rates of thermal expansion. In the case of nylon 6, for example, the rates of swelling and those of thermal expansion vary more or less from one manufacturer to another. Thus, it is best to adopt, as a plastic material having a larger rate of dimensional change, a plastic material which has larger rates of swelling and thermal expansion and, as a plastic material having a smaller rate of dimensional change, a plastic material which has smaller rates of both swelling and thermal expansion.

Particularly where the upper wall is molded of a plastic material having a larger rate of dimensional change and the fuel line or the pump casing is forced through the opening in the upper wall to be supported fast therein as in the embodiments of FIGS. 10, 11, since the inside diameter of the opening is increased by the swelling and thermal expansion of the plastic material of the upper wall, the opening should be designed in dimensions such that the opening will safely pass the fuel line or the pump casing and keep firm hold of it even when the expansion takes plce. The expression "upper wall" as used in the specification of this invention is a designation used for the sake of convenience because in all the diagrams, the upper wall is shown lying on top and the bottom wall lying on bottom. In the condition of actual service, the filter device often rests with the upper wall falling on the upper side. There are times, however, when the filter device is set sidewise within the fuel tank as proposed by Japanese Utility Model Publication No. 10917/1981, for example. The upper wall should, therefore, be understood as a wall serving to support the fuel line or the pump casing in position.

The invention has been described with reference to several embodiments. It should be noted, however, that this invention is not limited to these embodiments. It can be embodied in constructions freely varied within the purview of the technical idea set forth in the scope of claim for patent.

What is claimed is:

1. In a filter device for a fuel tank, comprising an upper wall formed integrally with, or admitting therethrough, a tubular member so as to support in position said tubular member, a bottom wall spaced from said upper wall, and a cylindrical wall consisting of a plurality of circumferentially spaced columns serving to support in position a mesh encircling a space intervening between said upper wall and said bottom wall, said cylindrical wall and either said upper wall or said bottom wall being molded of a plastic material in one integral part, the remaining bottom wall or upper wall being molded of a plastic material in one separate part, and said separate part being fixed to the free end of said cylindrical wall of said one integral part, the improvement which comprises an inner fitting peripheral wall surface provided on either the free end of said cylindrical wall of said one integral part or said separate part, an outer fitting peripheral wall surface provided on the alternative, a continuous protuberance formed in a circumferential direction on one of said two peripheral wall surfaces, a continuous recess formed in a circumferential direction on the other peripheral wall surface, the part containing said outer fitting peripheral wall surface being formed of a plastic material having a relatively small rate of dimensional change, and the part containing said inner fitting peripheral wall surface being formed of a plastic material having a relatively large rate of dimensional change.

2. A filter device according to claim 1, wherein the one integral part consists of a cylindrical wall and a bottom wall, the separate part consists of an upper wall, said cylindrical wall possesses an inner fitting peripheral wall surface, said upper wall possesses an outer fitting peripheral wall surface, said one integral part is formed of a plastic material having a larger rate of dimensional change, and said separate part is formed of a plastic material having a smaller rate of dimensional change.

3. A filter device according to claim 1, wherein the one integral part consists of a cylindrical wall and a bottom wall, the separate part consists of an upper wall, said cylindrical wall possesses an outer fitting peripheral wall surface, said upper wall possesses an inner fitting peripheral wall surface, said one integral part is formed of a plastic material having a smaller rate of dimensional change, and said separate part is formed of a plastic material having a larger rate of dimensional change.

4. A filter device according to claim 1, wherein the one integral part consists of a cylindrical wall and an upper wall, the separate part consists of a bottom wall, said cylindrical wall possesses an inner fitting peripheral wall surface, said bottom wall possesses an outer fitting perpheral wall surface, said one integral part is formed of a plastic material having a larger rate of dimensional change, and said separate part is formed of a plastic material having a smaller rate of dimensional change.

5. A filter device according to claim 1, wherein the one integral part consists of a cylindrical wall and an upper wall, the separate part consists of a bottom wall, said cylindrical wall possesses an outer fitting peripheral wall surface, said bottom wall possesses an inner fitting peripheral wall surface, said one integral part is formed of a plastic material having a smaller rate of dimensional change, and said separate part is formed of a plastic material having a larger rate of dimensional change.

6. A filter device according to any one of claims 1 through 5, wherein the plastic material having the larger rate of dimensional change is polyamide resin and the plastic material having the smaller rate of dimensional change is polyacetal resin.

7. A filter device according to claim 6, wherein said tubular member possesses an annular node projected from the outer periphery thereof, an opening in the upper wall for admitting and supporting in position said tubular member possesses along the inner periphery thereof a groove for engagement with said annular node, and said tubular member is passed and supported in said opening with said annular node held in engagement with said groove in the inner periphery of said opening of the upper wall.

8. A filter device according to claim 7, wherein said tubular member is a fuel line.

9. A filter device according to claim 7, wherein said tubular member is a pump casing.

10. A filter device according to claim 6, wherein said tubular member is threadedly passed through an opening in the upper wall and held in position therein.

11. A filter device according to claim 10 wherein said tubular member is a fuel line.

12. A filter device according to claim 10 wherein said tubular member is a pump casing.

13. A filter device according to claim 6, wherein said tubular member is integrally formed with the upper wall.

14. A filter device according to claim 13 wherein said tubular member is a fuel line.

15. A filter device according to claim 13 wherein said tubular member is a pump casing.

16. A filter device according to claim 6, wherein said tubular member is a fuel line.

17. A filter device according to claim 6, wherein said tubular member is a pump casing.

18. A filter device according to any one of claims 1 through 5, wherein said tubular member possesses an annular node projected from the outer periphery thereof, an opening in the upper wall for admitting and supporting in position said tubular member possesses along the inner periphery thereof a groove for engagement with said annular node, and said tubular member is passed and supported in said opening with said annular node held in engagement with said groove in the inner periphery of said opening of the upper wall.

19. A filter device according to claim 18, wherein said tubular member is a fuel line.

20. A filter device according to claim 18, wherein said tubular member is a pump casing.

21. A filter device according to any one of claims 1 through 5, wherein said tubular member is threadedly passed through an opening in the upper wall and held in position therein.

22. A filter device according to claim 21, wherein said tubular member is a fuel line.

23. A filter device according to claim 21, wherein said tubular member is a pump casing.

24. A filter device according to any one of claims 1 through 5, wherein said tubular member is integrally formed with the upper wall.

25. A filter device according to claim 24, wherein said tubular member is a fuel line.

26. A filter device according to claim 24, wherein said tubular member is a pump casing.

27. A filter device according to any one of claims 1 through 5, wherein said tubular member is a fuel line.

28. A filter device according to any one of claims 1 through 5, wherein said tubular member is a pump casing.

* * * * *